US012791669B2

United States Patent
Yamamoto et al.

(10) Patent No.: US 12,791,669 B2
(45) Date of Patent: Nov. 10, 2026

(54) RANGING APPARATUS

(71) Applicant: DENSO CORPORATION, Kariya-city (JP)

(72) Inventors: Masahiro Yamamoto, Kariya-city (JP); Chiharu Uchiyama, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 1358 days.

(21) Appl. No.: 17/645,574

(22) Filed: Dec. 22, 2021

(65) Prior Publication Data

US 2022/0113381 A1 Apr. 14, 2022

Related U.S. Application Data

(63) Continuation of application No. PCT/JP2020/025047, filed on Jun. 25, 2020.

(30) Foreign Application Priority Data

Jun. 28, 2019 (JP) ................................ 2019-121789

(51) Int. Cl.
*G01S 7/497* (2006.01)
*B60S 1/02* (2006.01)
(Continued)

(52) U.S. Cl.
CPC ............ *G01S 7/4813* (2013.01); *B60S 1/026* (2013.01); *G01S 7/4047* (2021.05);
(Continued)

(58) Field of Classification Search
CPC ...... G01S 7/4813; G01S 7/4047; G01S 7/497; G01S 17/931; G01S 2007/4977;
(Continued)

(56) References Cited

U.S. PATENT DOCUMENTS 6,414,623 B1 * 7/2002 Ashihara ............... G01S 7/4004 342/173
6,630,901 B1 10/2003 Winter et al.
(Continued)

FOREIGN PATENT DOCUMENTS

DE 19705416 C1 3/1998
JP 2002-144842 A 5/2002
(Continued)

OTHER PUBLICATIONS

Heat transfer coefficient—Wikipedia, URL:https://ja.wikipedia.org/w/index.php?title=%E7%86%B1%E4%BC%9D%E9%81%94%E7%8E%87@oldid=73079212, retrieved on Sep. 7, 2020, Jun. 12, 2019, 15 pgs.
Nusselt number—Wikipedia, URL:https://ja.wikipedia.org/w/index.php?title=%E3%83%80%E3%82%BB%E3%83%AB%E3%83%88%E6%95%B0@oldid=66335713, retrieved on Sep. 7, 2020, Nov. 18, 2017, 13 pgs.

*Primary Examiner* — Tiffany T Tran
(74) *Attorney, Agent, or Firm* — Precision Patents, P.C.

(57) ABSTRACT

A ranging apparatus is provided which is mountable to a vehicle and emits a transmit wave and receives a reflected wave arising from reflection of the transmit signal from an object to calculate a distance to the object. The ranging apparatus includes a light transmissive window, a heater, and a controller. The light transmissive window permits at least one of the transmit wave and the reflected wave to pass through. The heater works to add thermal energy to the light transmissive window. The controller uses an ambient temperature outside the ranging apparatus and a speed of the vehicle derived from a vehicle speed sensor to control energization of the heater. When the vehicle speed sensor is malfunctioning, the controller controls the energization of the heater as a function of the ambient temperature without use of the speed of the vehicle.

8 Claims, 9 Drawing Sheets

(51) Int. Cl.
*G01S 7/40* (2006.01)
*G01S 7/481* (2006.01)
*G01S 17/931* (2020.01)
*B60S 1/56* (2006.01)

(52) U.S. Cl.
CPC ............... *G01S 17/931* (2020.01); *B60S 1/56* (2013.01); *G01S 7/497* (2013.01); *G01S 2007/4977* (2013.01)

(58) Field of Classification Search
CPC ........... G01S 7/027; G01S 2007/52011; G01S 2013/9323; G01S 2013/9324; G01S 13/931; G01S 15/931; B60S 1/026; B60S 1/56
See application file for complete search history.

(56) References Cited

U.S. PATENT DOCUMENTS

| | | | | |
|---|---|---|---|---|
| 2012/0131905 | A1* | 5/2012 | Kwon | F01N 3/2066 60/274 |
| 2014/0320845 | A1* | 10/2014 | Bayha | B29C 70/72 356/5.03 |
| 2016/0230635 | A1* | 8/2016 | Fujie | B01D 53/9477 |
| 2019/0101629 | A1* | 4/2019 | Wakamiya | G01S 13/931 |

FOREIGN PATENT DOCUMENTS

| | | | |
|---|---|---|---|
| JP | 2005-350026 | A | 12/2005 |
| JP | 2009-99033 | A | 5/2009 |

* cited by examiner

| VEHICLE SPEED \ AMBIENT TEMP. | 10℃～0℃ | 0～-10℃ | -10～-20℃ |
|---|---|---|---|
| 0～30km/h | 2[W] | 4[W] | 6[W] |
| 30～70km/h | 4[W] | 6[W] | 8[W] |
| 70～100km/h | 6[W] | 8[W] | 10[W] |
| 100km/h～ | 8[W] | 10[W] | 12[W] |

RANGING APPARATUS

CROSS REFERENCE TO RELATED DOCUMENT

The present application claims the benefit of priority of Japanese Patent Application No. 2019-121789 filed on Jun. 28, 2019, the disclosure of which is incorporated in its entirely herein by reference.

TECHNICAL FIELD

This disclosure generally relates to a ranging apparatus.

BACKGROUND ART

There are ranging devices which are mounted in a vehicle and designed to transmits waves forward and receive a return of the wave reflected from an object to calculate a distance to the object.

The ranging devices are equipped with a cover arranged on a front surface thereof to physically protect transmitter which transmits waves and a receiver which receives returns of the waves. Adhesion of snow to the cover may, however, result in a decrease in measurement accuracy of the ranging devices.

Patent literature 1 teaches installation of a heater in the cover of the ranging device to melt the snow.

PRIOR ART DOCUMENT

Patent Literature

Patent Literature 1 Japanese Translation of PCT Internal Application Publication No. 2015-506459

SUMMARY OF THE INVENTION

In case where a heater is mounted in a window of the cover of the ranging device through which a transmit wave and a return of the transmit wave pass, a target amount of electricity supplied to the heater may be calculated using the speed of the vehicle measured by a speed sensor and an outside temperature to control energization of the heater.

The inventors of this application have reviewed and found that the above control system faces a risk that a malfunction of the speed sensor may result in a difficulty in calculating the amount of electricity required to be supplied to the heater or in an error in calculation of that amount of electricity, which requires stopping the heater.

One aspect of this disclosure to provide techniques of keeping a heater activated even if a malfunction of a vehicle speed sensor occurs.

According to one aspect of the disclosure, there is provided a ranging apparatus which is mountable in a vehicle and works to emit a transmit wave and detects a reflected wave resulting from reflection of the transmit wave from an object to determine a distance between itself and the object. The ranging apparatus comprises: (a) a light transmissive window through which at least one of the transmit wave and the reflected wave passes; (b) a heater which is configured to add heat to the transmissive window; and (c) a controller which works to control energization of the heater as a function of an ambient temperature outside the ranging apparatus and a speed of the vehicle derived by a vehicle speed sensor. When the vehicle speed sensor is malfunctioning, the controller controls the energization of the heater as a function of the ambient temperature without use of the speed of the vehicle.

In the aspect of this disclosure, the ranging apparatus is designed to emit the transmit wave and detect the reflected wave arising from reflection of the transmit wave from the object to calculate the distance to the object. The ranging apparatus includes the light transmissive window, the heater, and the controller. The light transmissive window is configured to permit at least one of the transmit wave and the reflected wave to pass therethrough. The heater works to heat the transmissive window. The controller is configured to control the energization of the heater using the ambient temperature that is a temperature outside the ranging apparatus and the speed of the vehicle measured by the vehicle speed sensor. When the vehicle speed sensor is malfunctioning, the controller controls the energization of the heater based on the ambient temperature without use of the speed of the vehicle.

With the above arrangements, it is possible to properly operate the heater in the event of malfunction of the vehicle speed sensor.

MODE FOR CARRYING OUT THE INVENTION

Figure 1:
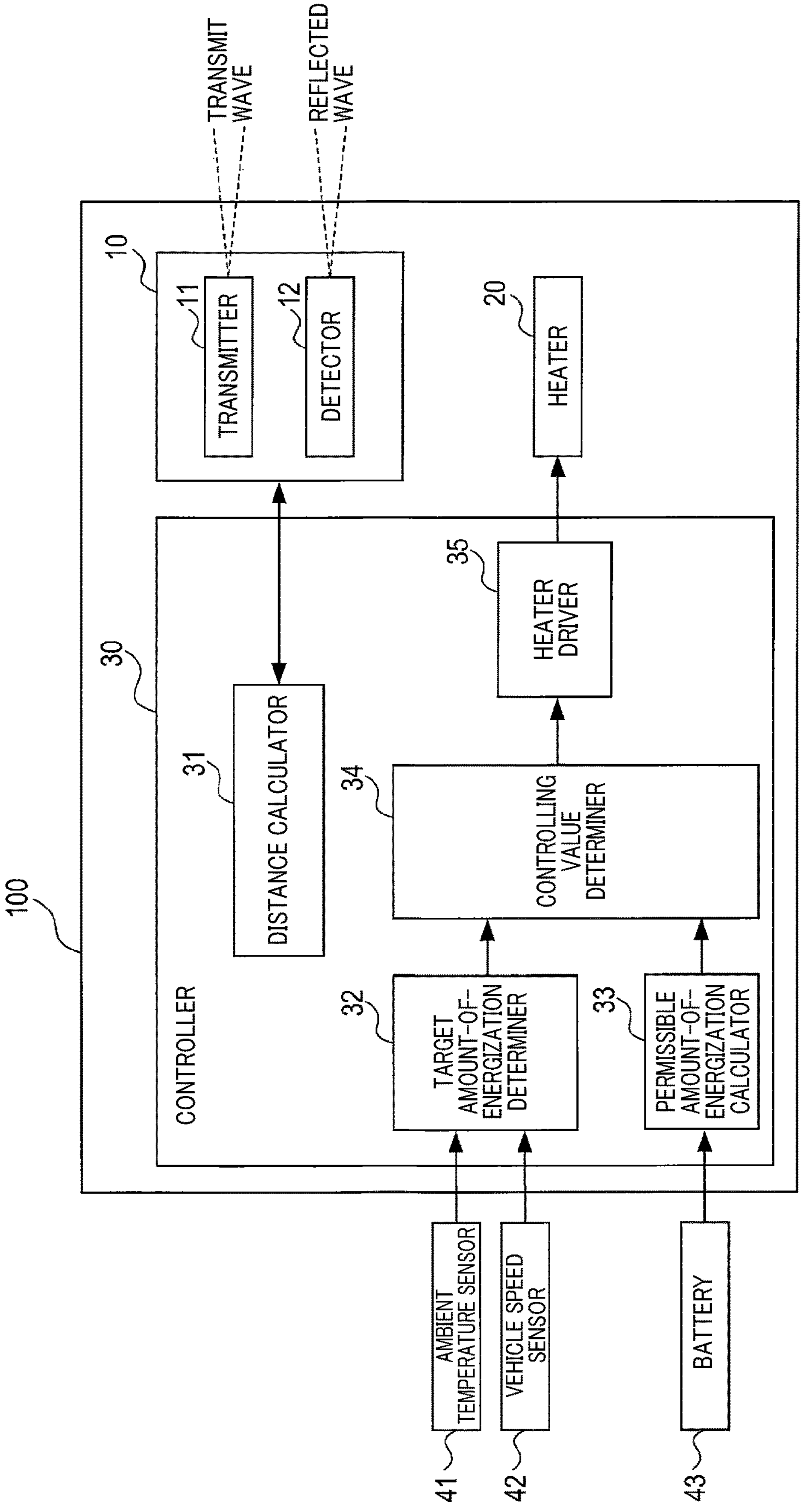
FIG. 1 is a block diagram which illustrates a structure of a LiDAR apparatus according to the first embodiment.

Embodiments in this disclosure will be described below with reference to the drawings.

First Embodiment 1-1 Structure

The LiDAR apparatus 100 is a ranging device working to emit light in the form of a transmission wave and detect a reflected wave from an object irradiated with the light to calculate a distance to the object. LiDAR stands for Light Detection and Ranging. The LiDAR apparatus 100 is mounted in a vehicle in use to detect various types of objects present ahead of the vehicle.

The LiDAR apparatus 100 includes the measuring device 10, the heater 20, and the controller 30.

The measuring device 10 includes the transmitter 11 working to emit light and the detector 12 working to receive a reflected light resulting from reflection of the emitted light.

Specifically, the transmitter 11 outputs light in the form of laser light. The detector 12 receives a return of the light from an object and converts it into an electrical signal.

Figure 2:
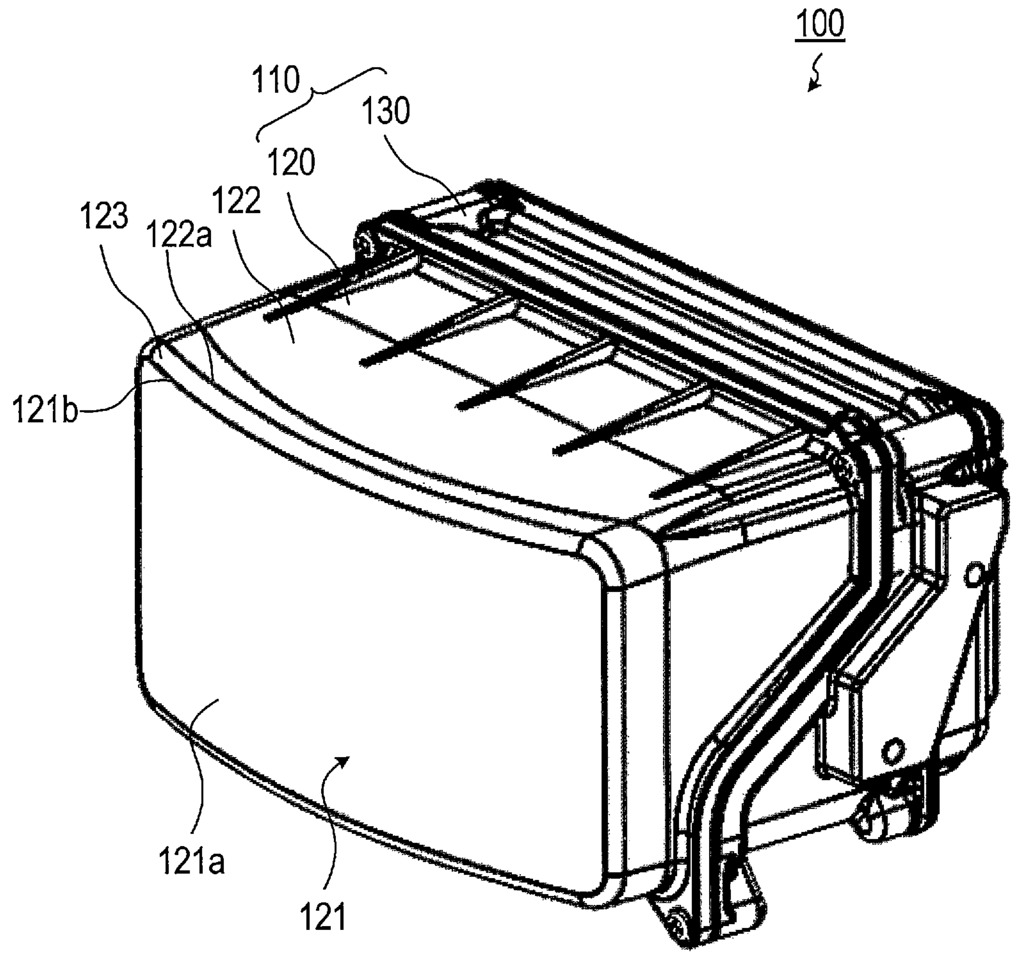
FIG. 2 is a view of an outer appearance of a LiDAR apparatus.

The measuring device 10 is disposed inside the case 110 including the cover 120 and the case body 130 of the LiDAR apparatus 100 illustrated in FIG. 2. The transmitter 11 of the measuring device 10 is disposed in an upper region of space in the case 110, while the detector 12 is disposed in a lower region of space in the case 110.

The cover 120 has disposed in a front portion thereof the transparent light transmissive window 121 which defines a portion of the cover 120 and allows light to pass therethrough. The front, as referred to herein, indicates a forward direction in which the LiDAR apparatus 100 emits light. The light transmissive window 121 isolates the inside of the LiDAR apparatus 100 from the outside thereof.

Figure 3:
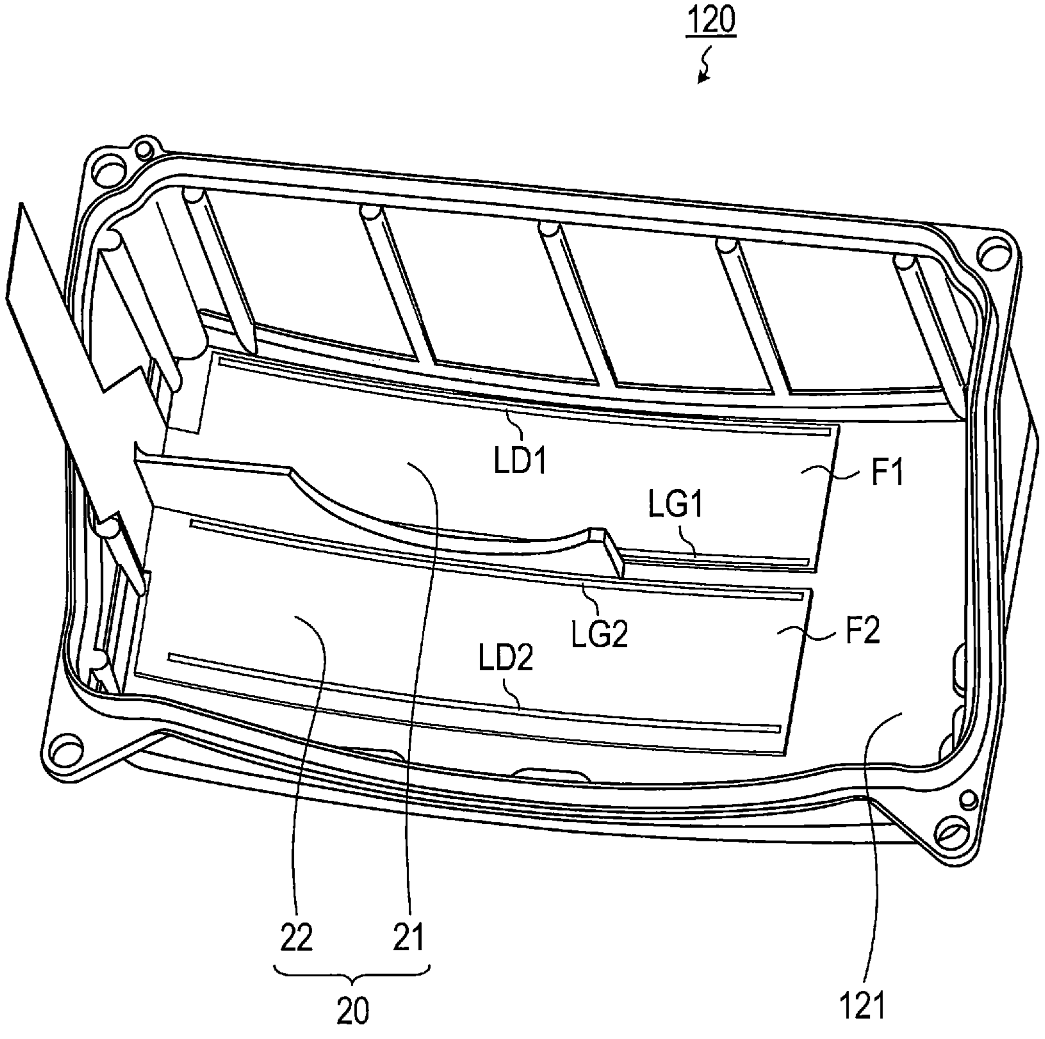
FIG. 3 is an illustration of a LiDAR apparatus, as viewed from inside the LiDAR apparatus.

The heater 20 works to add heat from inside the LiDAR apparatus 100 to the light transmissive window 121. The heater 20 is, as clearly illustrated in FIG. 3, attached to an inner surface of the light transmissive window 121. The heater 20 includes the transmitter heater 21 disposed on a portion of the light transmissive window 121 which is located close to the transmitter 11 and the detector heater 22 disposed on a portion of the light transmissive window 121 which is located close to the detector 12. Each of the transmitter heater 21 and the detector heater 22 is equipped with a transparent conductive film Fi and a pair of electrodes LDi and LGi. "i" represents 1 when it belongs to the transmitter heater 21 or 2 when it belongs to the detector heater 22. The transparent conductive film Fi is used as a heater film made from material which is transparent and electrically conductive. For instance, the transparent conductive film Fi is made by an ITO (Indium Tin Oxide) film.

The controller 30 illustrated in FIG. 1 is implemented by a microcomputer which is made up of a CPU, a RAM, a ROM, an I/O interface, and bus lines connecting them and operative to execute a variety of tasks. The controller 30 includes functional blocks or virtual components realized by executing programs stored in the ROM. Specifically, the controller 30 includes the distance calculator 31, the target amount-of-energization determiner 32, the permissible amount-of-energization calculator 33, the controlling value determiner 34, and the heater driver 35.

The distance calculator 31 is configured to calculate a distance to an object irradiated with light using the measuring device 10. Specifically, the distance calculator 31 analyzes the waveform of an electrical signal inputted from the detector 12 into the distance calculator 31 to determine a time when the reflected light was detected and calculates the distance to the object as a function of a difference between the time when the light was emitted and the time when the reflected light was detected. The distance calculator 31 is also capable of obtaining information about, for example, an azimuth of the object in addition to the distance to the object.

The target amount-of-energization determiner 32 is configured to determine a target amount of electricity supplied to the heater 20 (which will also be referred to as a target amount of energization) using information derived by the ambient temperature sensor 41 and the vehicle speed sensor 42. The operation, as will be described later in detail, executed by the target amount-of-energization determiner 32 is to calculate, as a target amount of electricity, an electrical power that is the rate, per unit time, at which electrical energy is delivered to the heater 20. The target amount-of-energization determiner 32 obtains an ambient temperature that is the temperature outside the LiDAR apparatus 100 from the ambient temperature sensor 41 mounted in the vehicle. The ambient temperature sensor 41 is arranged on a lower portion of the vehicle and works to measure the temperature outside the vehicle. The target amount-of-energization determiner 32 derives the speed of the vehicle (which will also be referred to below as vehicle speed) in which the LiDAR apparatus 100 is mounted from the vehicle speed sensor 42 arranged in the vehicle or a malfunction signal indicating the fact that the vehicle speed sensor 42 is malfunctioning. The vehicle speed sensor 42 measures the vehicle speed and diagnoses whether the vehicle speed sensor 42 itself is malfunctioning. When the vehicle speed sensor 42 is determined to be malfunctioning, it outputs the malfunction signal to the target amount-of-energization determiner 32.

The permissible amount-of-energization calculator 33 works to analyze the level of voltage (which will also be referred to below as battery voltage) developed at the battery 43 mounted in the vehicle to calculate the amount of electricity the battery 43 is capable of supplying or outputting (which will also be referred to below as permissible amount-of-electricity).

The controlling value determiner 34 is configured to determine a controlling value, as will be described later in detail, used for control the energization of the heater 20 by the heater driver 35. The controlling value, as referred to in this embodiment, represents a duty cycle or duty factor that is a ratio of a period of time for which the electricity is supplied to the heater 20 to a period of time for which the electricity is stopped from being supplied to the heater 20. The controlling value determiner 34 determines the duty factor as a function of the target amount of electricity derived by the target amount-of-energization determiner 32 and the permissible amount-of-electricity calculated by the permissible amount-of-energization calculator 33. In this embodiment, the battery 43 is connected directly to the heater 20 without passing through a constant voltage circuit in the vehicle, so that the voltage applied to the heater 20 usually varies with a change in the battery voltage. The controlling value determiner 34, therefore, determines the duty factor as a function of the amount of electricity the battery 42 is now capable of outputting to bring an actual amount of electricity supplied to the heater 20 into agreement with the target amount of electricity determined by the target amount-of-energization determiner 32.

The heater driver 35 is configured to control the energization of the heater 20 based on the controlling value determined by the controlling value determiner 34.

1-2 Operation

Figure 4:
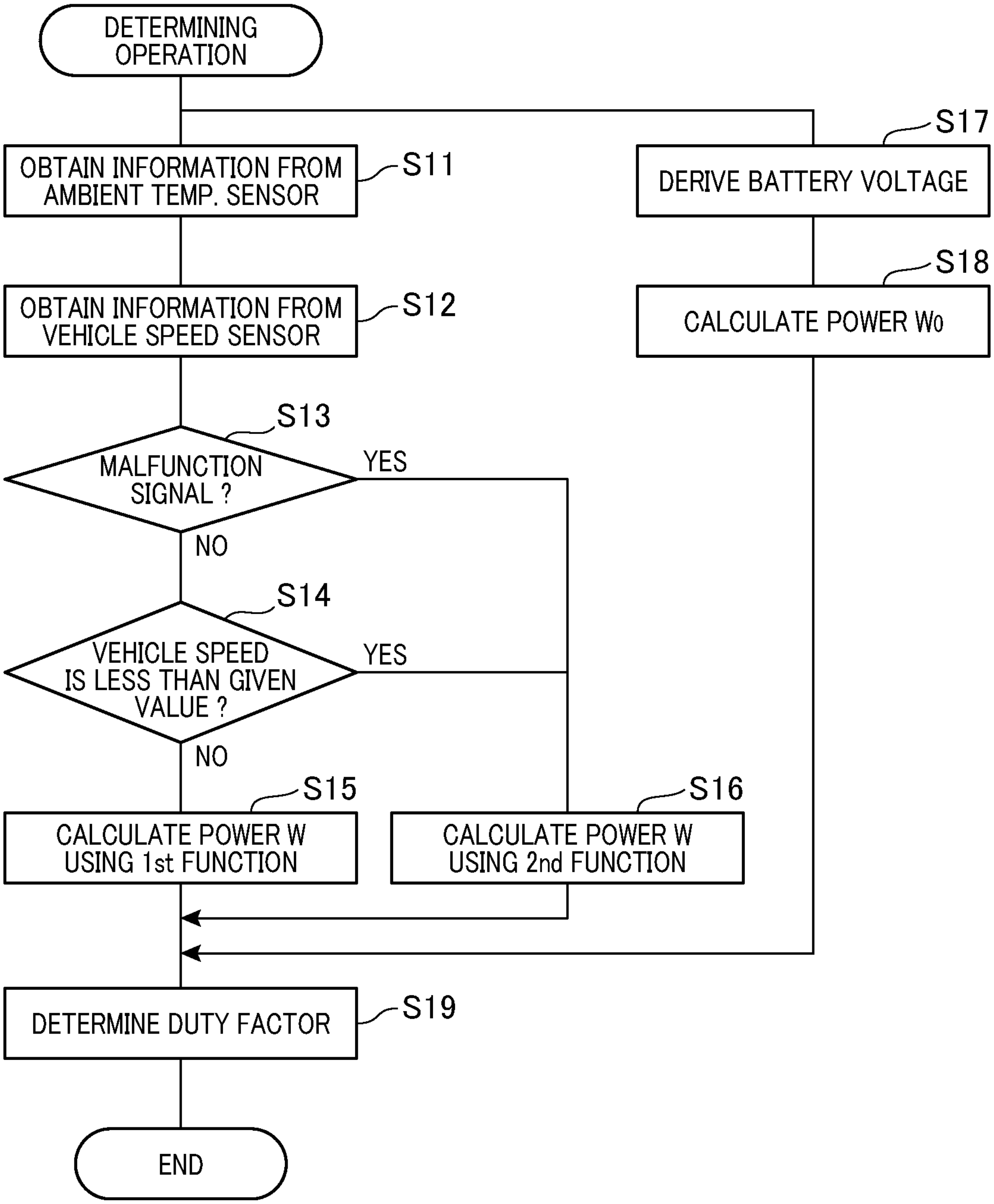
FIG. 4 is a flowchart of a determining operation executed by a controller in the first embodiment.

A determining operation executed by the controller 30 will be described below with reference to a flowchart in FIG. 4. The determining operation in FIG. 4 is performed cyclically at a given interval after an ignition switch of the vehicle is turned on.

First, in step S11, the controller 30 obtains information about the ambient temperature from the ambient temperature sensor 41.

In step S12, the controller 30 obtains information about the speed of the vehicle or the malfunction signal from the vehicle speed sensor 42.

In step S13, the controller 30 determines whether the information derived from the vehicle speed sensor 42 represents the malfunction signal.

If the controller 30 determines in step S13 that the information derived from the vehicle speed sensor 42 does not represent the malfunction signal, then the routine proceeds to step S14 wherein it is determined whether the speed of the vehicle is lower than or equal to a given speed that is a reference value for use in determining whether the speed of the vehicle is sufficiently low. In this embodiment, the reference value is selected to be 5 km/h.

If the controller 30 determines in step S14 that the speed of the vehicle is not lower than or equal to the given speed, then the routine proceeds to step S15.

In step S15, the controller 30 determines the electrical power W [W] need to be supplied to the heater 20 using the derived ambient temperature and the derived speed of the vehicle. The electrical power W, as referred to herein, is a target power supply for the heater 20. The electrical power W is calculated according to the following mathematical formula (which will also be referred to as the first function) using parameters representing the ambient temperature and the speed of the vehicle.

The electrical power W is derived by the equation (1) below which includes the heat transfer coefficient h [W/($m^2$·K)] and a value derived by subtracting the ambient temperature $T_0$ [K] from a predetermined target surface temperature $T_1$[K] of the heater 20.

$$W = q \times A = h \times (T_1 - T_0) \times A \tag{1}$$

where q is thermal flux [W/$m^2$], and A is a surface area [$m^2$] of the heater 20.

The heat transfer coefficient h is derived using the Nusselt number Nu and the characteristic length L.

The Nusselt number Nu, as referred to herein, is an Nusselt number assuming that forced convection is created in the shape of a flat plate to act on an upper surface 122 or a lower surface 124 of the case 110 in the LiDAR apparatus 100 mounted in the vehicle.

Figures 5, 6:
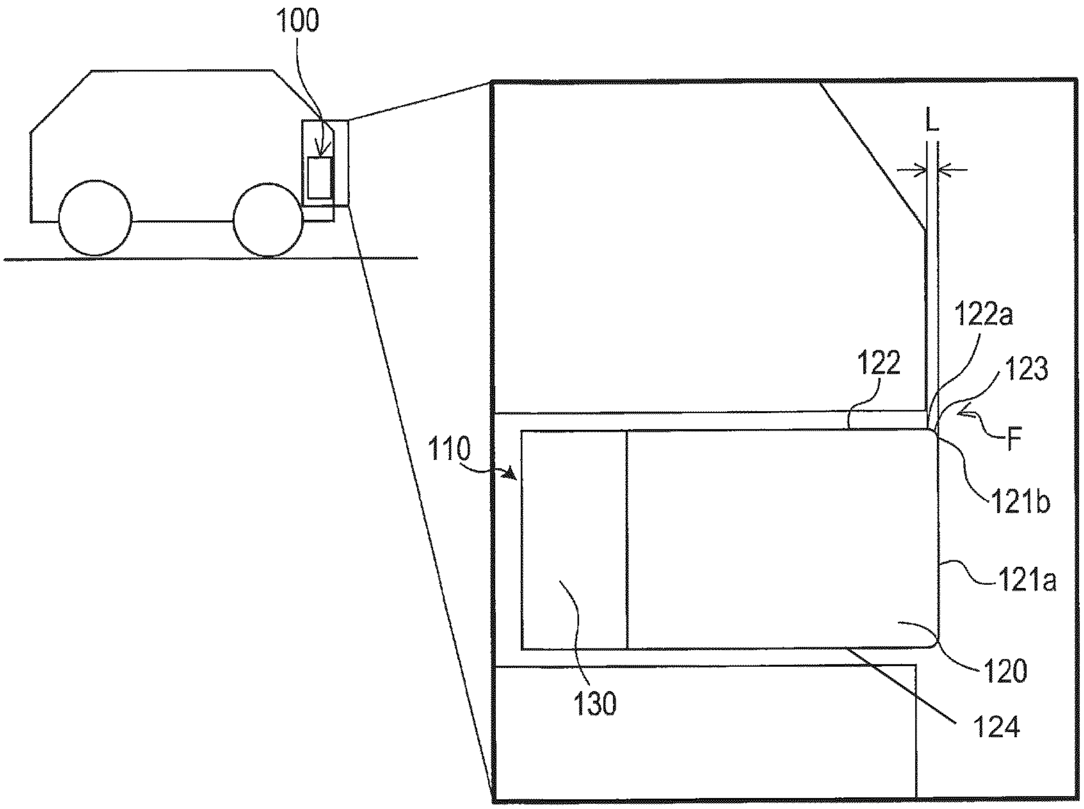
FIG. 5 is a sectional view of a LiDAR apparatus mounted in a vehicle.
FIG. 6 is a table listing a relation of an electrical power supplied to a heater with an ambient temperature and a speed of a vehicle.

The characteristic length L is a length of at least a portion of the upper surface 122 or the lower surface 124 of the case 110 which extends in a direction in which the vehicle travels. The characteristic length L may be selected in a range of the length of the portion of the upper surface 122 or the lower surface 124 of the case 110 which extends in the direction in which the vehicle travels. The characteristic length L in this embodiment will be described below with reference to FIG. 5. FIG. 5 demonstrates a cross section of the LiDAR apparatus 100 taken in a vertical direction perpendicular to the travel direction of the vehicle. In the cross section, the characteristic length L represents a dimension of the round corner 123 of the case 110 in the travel direction. The round corner 123 connects between the upper surface 122 of the cover 120 that is a portion of the case 110 and the front surface 121*a* of the light transmissive window 121. More specifically, the characteristic length L is given in a range where a portion of the case 100 extending in the travel direction of the vehicle decreases gradually, that is, a dimension of the case 100 between the upper edge 121b of the front surface 121a of the light transmissive window 121 and the front edge 122a of the upper surface 122 of the cover 120 in the travel direction of the vehicle. The round corner 123 is a portion of the cover 120 of the LiDAR apparatus 100 which is the most affected by the flow F of air which contacts the front surface 121a of the light transmissive window 121 and is then directed toward a bumper of the vehicle during traveling of the vehicle.

The heat transfer coefficient h is expressed according to the following equations (2) to (4).

$$h = Nu \times \lambda \div L \tag{2}$$

$$Nu = 0.037 \times Re^{4/5\times} \times P^{1/3} (Re > 3.2 \times 10^5) \tag{3}$$

$$Nu = 0.664 \times Re^{1/2} \times P^{\frac{1}{3}} (Re \leq 3.2 \times 10^5) \tag{4}$$

where λ is the thermal conductivity of air [W/m·K], Re is Reynolds number, and P is Prandtl number. The Prandtl number is the ratio of kinematic viscosity coefficient v [$m^2$/s] of air to thermal diffusivity coefficient a [$m^2$/s] of air. The Reynolds number is given by the following equation (5).

$$Re = U \times L \div v \tag{5}$$

where U is the speed of vehicle [m/s].

If the controller 30 determines in step S13 that the information derived from the vehicle speed sensor 42 represents the malfunction signal or if the controller 30 determines in step S14 that the speed of the vehicle is lower than or equal to the given speed, then the routine proceeds to step S16.

In step S16, the controller 30 determines the electrical power W [W] to be supplied to the heater 20 as a function of the ambient temperature without use of the speed of the vehicle. The electrical power W is a target power supply for the heater 20. The electrical power W is calculated using a parameter indicating the ambient temperature, not the speed of the vehicle according to an equation below (which will also be referred to as a second function). The operations in steps S11 to S16 correspond to tasks of the target amount-of-energization determiner 32.

The electrical power W is calculated by the product of the constant C, a value derived by subtracting the ambient temperature $T_0$ [K] from a predetermined target surface temperature $T_1$ [K] of the heater 20, and the surface area A [$m^2$] of the heater 20 according to equation (6) below.

$$W = C \times (T_1 - T_0) \times A \tag{6}$$

In this embodiment, an actual value of the heat transfer coefficient h derived experimentally in the following conditions is used as the constant C [W/($m^2$·K)].

In step S17, the controller 30 obtains the level of voltage at the battery 43.

In step S18, the controller 30 calculates the electrical power $W_0$ the battery 43 is capable of outputting as a function of the level of the voltage at the battery 43 derived in step S17. The operations in steps S17 to S18 correspond to tasks of the permissible amount-of-energization calculator 33.

In step S19, the controller 30 determines the duty factor using the electrical power W, as derived according to the first function in step S15 or the electrical power W, as derived according to the second function in step S16, and the electrical power $W_0$ calculated in step S18. Subsequently, the controller 30 terminates the determining operation in FIG. 4. The operation in step S19 corresponds to a task of the controlling value determiner 34.

The controller 30 additionally executes a control operation to control energization of the heater 20 using the duty factor calculated in the determining operation in FIG. 4. The control operation corresponds to a task of the heater driver 35.

1-3 Beneficial Advantages

The above described first embodiment offers the following advantages.

1*a*) The controller 30 is configured to control the energization of the heater 20 as a function of the ambient temperature and the speed of the vehicle. If, however, the vehicle speed sensor 42 is malfunctioning, the controller 30 works to control the energization of the heater 20 as a function of the ambient temperature without use of the speed of the vehicle. This ensures the stability in operation of the heater 20 in the event of the malfunction of the vehicle speed sensor 42.

1*b*) When the speed of the vehicle is less than or equal to the given speed, the controller 30 controls the energization of the heater 20 as a function of the ambient temperature without use of the speed of the vehicle. In this embodiment, the given speed is set to 5 km/h. When the vehicle is moving at such a low speed, the use of both the ambient temperature and the speed of the vehicle to control the energization of the heater 20 may result in a failure in properly controlling the operation of the heater 20. For instance, when the speed of the vehicle is low, the calculation of the target power supply according to the first function using parameters indicating the ambient temperature and the speed of the vehicle will cause the calculated value of the target power supply to be undesirably low, which results in insufficient amount of electricity supplied to the heater 20. This embodiment is designed to eliminate such a problem and ensures the stability in supplying a required amount of electricity to the heater 20 when the speed of the vehicle is low.

1*c*) When controlling the energization of the heater 20 using the ambient temperature and the speed of the vehicle, the controller uses the first mathematical function using parameters representing the ambient temperature and the speed of the vehicle to control the amount of electricity supplied to the heater 20. This optimizes the amount of electrical energy delivered to the heater 20 and reduces the consumption of electrical power by the heater 20.

1*d*) When controlling the energization of the heater 20 as a function of the ambient temperature without use of the speed of the vehicle, the controller 30 uses the second mathematical function using the parameter representing the ambient temperature, not the speed of the vehicle to control the amount of electricity supplied to the heater 20. This also optimizes the amount of electrical energy delivered to the heater 20 depending upon the ambient temperature without use of the speed of the vehicle and reduces the consumption of electrical power by the heater 20.

1*e*) The vehicle speed sensor 42 diagnoses whether the vehicle speed sensor 42 itself is malfunctioning and outputs the malfunction signal in the even the of the malfunction thereof to the controller 30. When receiving the malfunction signal from the vehicle speed sensor 42, the controller 30 switches the control mode thereof to the mode used to control the energization of the heater 20 when the vehicle speed sensor 42 is determined to be malfunctioning. This enhances the accuracy in diagnosis of the malfunction of the vehicle speed sensor 42 as compared with the case where the controller 30 uses information derived in the form of a pulse signal from the vehicle speed sensor 42.

Second Embodiment

2-1 Differences from the First Embodiment

The second embodiment is basically identical in structure with the first embodiment. The differences from the first embodiment will mainly be described without referring to the common structural elements.

In the first embodiment, when the ambient temperature and the speed of the vehicle are used to control the energization of the heater 20, the controller 30 uses the first function using parameters indicating the ambient temperature and the speed of the vehicle to control the amount of electricity supplied to the heater 20. Specifically, in step S15 in FIG. 4, the controller 30 works to calculate the electrical power W to be supplied to the heater 20 using the first function.

In the second embodiment, when the ambient temperature and the speed of the vehicle are used to control the energization of the heater 20, the controller 30 works to control the amount of electricity supplied to the heater 20 using a table representing predefined conditions to energize the heater 20. Specifically, the controller 30 calculates the target power supply to the heater 20 in step S15 in FIG. 4 by look-up using the table illustrated in FIG. 6 in which the electrical power W supplied to the heater 20 is predefined as a function of the ambient temperature and the speed of the vehicle. In the table in FIG. 6, the electrical power W is selected to increase with a decrease in ambient temperature or a rise in speed of the vehicle.

When only the ambient temperature is determined to be used to control the energization of the heater 20 in the second embodiment, the controller 30 works to control the amount of electricity delivered to the heater 20 according to the second function using a parameter representing the ambient temperature, not the speed of the vehicle. This is because the first function is a complex mathematical formula, so that the use of the table instead will offer a high degree of advantage which decreases a period of time required to calculate the electrical power W, while the second function is a simple mathematical formula, so that the use of the table instead does not offer a higher degree of advantage than the use of the table in place of the first function.

2-2 Beneficial Advantages

The second embodiment is capable of properly controlling the energization of the heater 20 in a simpler operation than the first embodiment when both the ambient temperature and the speed of the vehicle are used to calculate the amount of electricity to be supplied to the heater 20.

3 Third Embodiment

3-1 Differences from the First Embodiment

The third embodiment is basically identical in structure with the first embodiment. The differences from the first embodiments will mainly be described without referring to the common structural elements.

Figure 7:
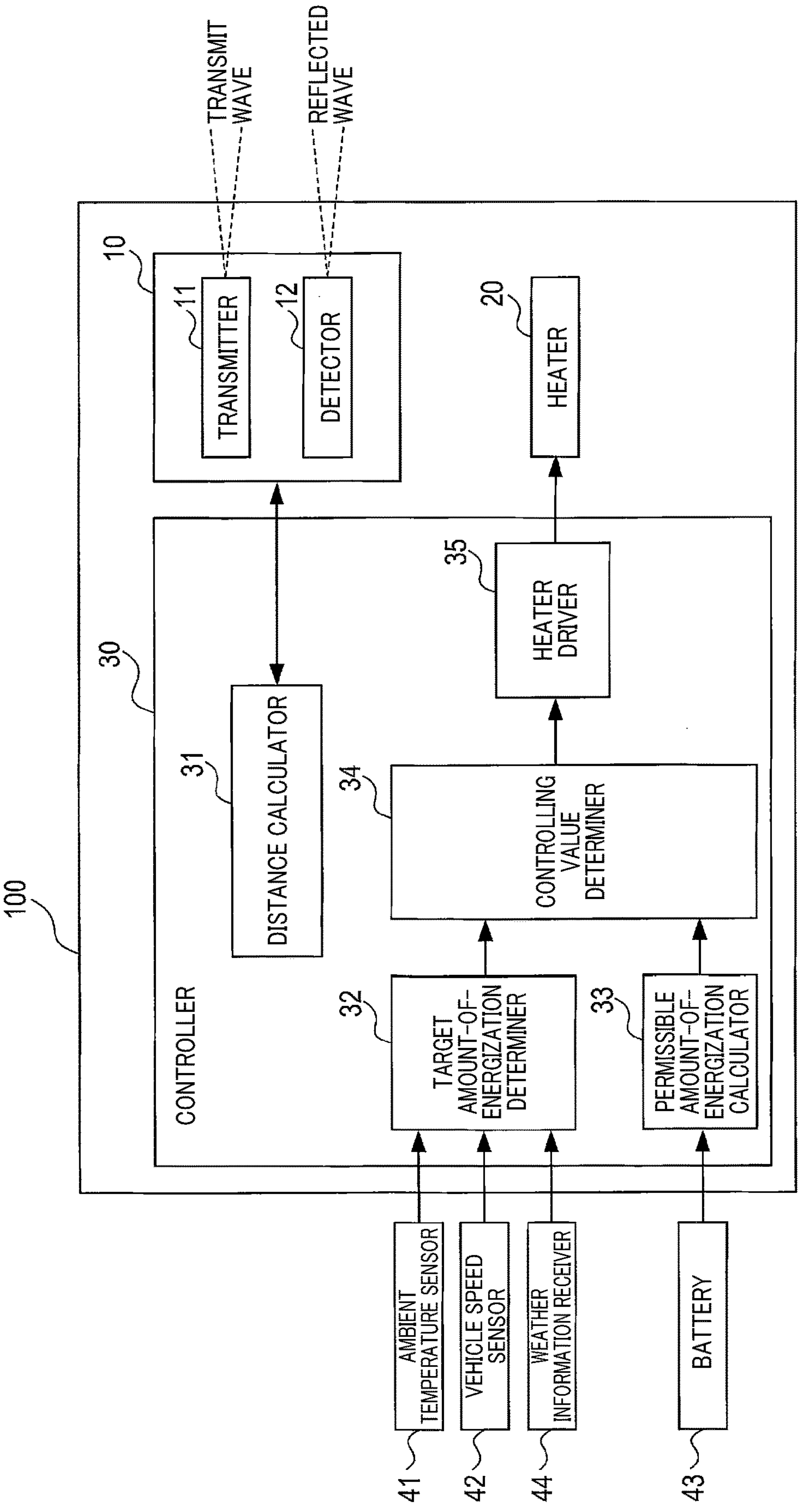
FIG. 7 is a block diagram which illustrates a structure of a LiDAR apparatus according to the third embodiment.

In the third embodiment, the controller 30, as can be seen in FIG. 7, analyzes weather information derived by the weather information receiver 44 to determine at least a snowfall condition around the vehicle and controls the energization of the heater 20 using the snowfall condition in addition to the ambient temperature and the speed of the vehicle. The weather information receiver 44 receives the weather information in a region including at least an area where the vehicle is now traveling from an information and telecommunications system, such as a VICS that is a registered trade mark. The weather information obtained by the weather information receiver 44 includes information about snowfall in the above region. The controller 30 analyzes the snowfall condition in the region derived by the weather information receiver 44 to determine a snowfall condition, such as the amount of snow, around the vehicle.

3-2 Operation

Figure 8:
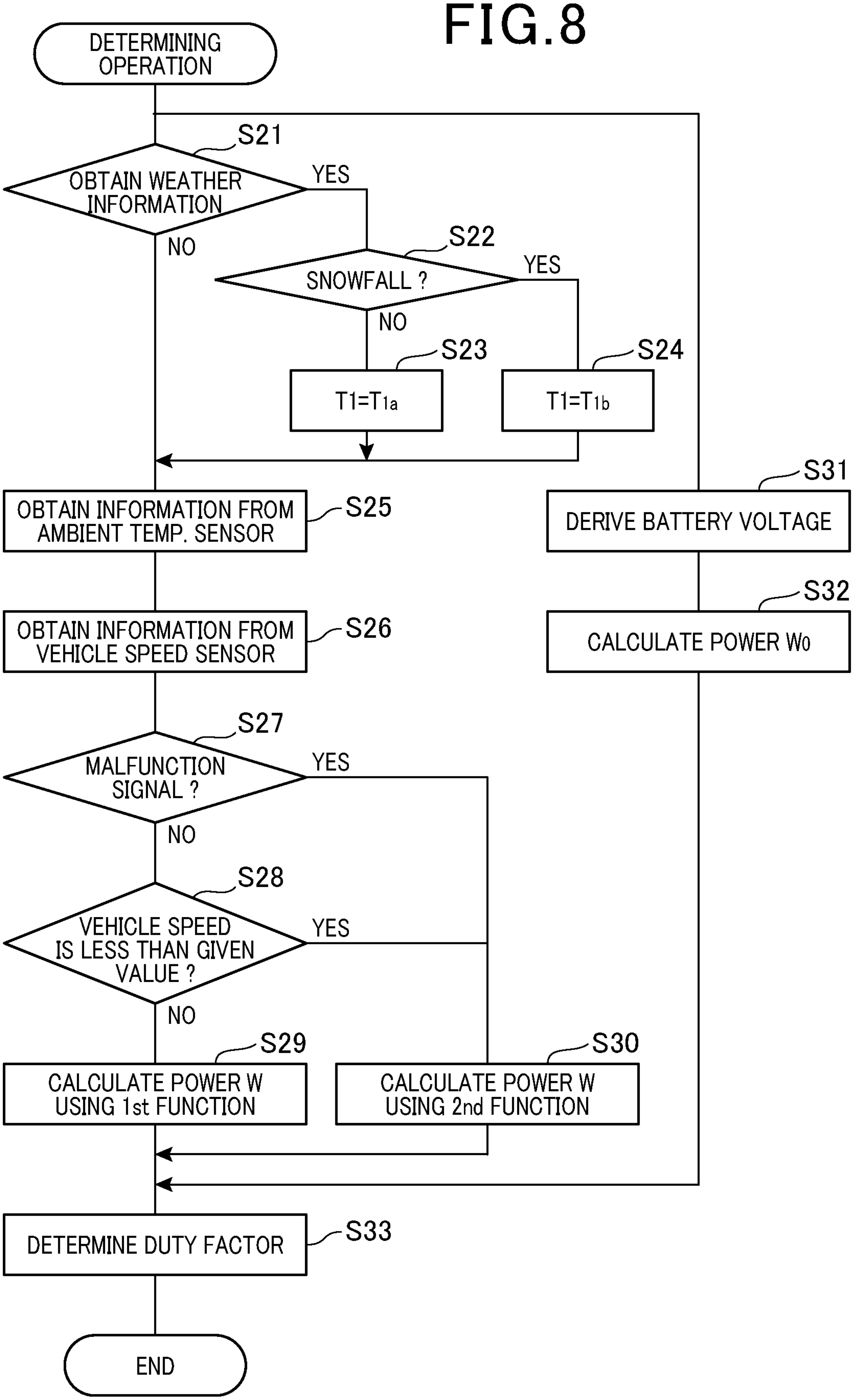
FIG. 8 is a flowchart of a determining operation executed by a controller in the third embodiment.

A determining operation executed by the controller 30 in the third embodiment instead of that in the first embodiment will be described below using a flowchart in FIG. 8. The determining operation in FIG. 8 is performed cyclically at a given interval upon turning on of the ignition switch of the vehicle.

First, in step S21, the controller 30 determines whether the weather information receiver 44 has received the weather information in a region including an area where the vehicle is traveling.

If it is determined in step S21 that the weather information receiver 44 has received the weather information, the routine proceeds to step S22 wherein the controller 30 analyzes the weather information derived by the weather information receiver 44 to determine whether there is a snowfall in the region.

If it is determined in step S22 that there is no snowfall in the region, then the routine proceeds to step S23 wherein the controller 30 sets the predetermined target surface temperature $T_1$ in the above equation (1) to a target surface temperature $T_{1a}$ that is a usual temperature where there is no snowfall. The routine then proceeds to step S25.

Alternatively, if the controller 30 determines in step S22 that there is a snowfall, then the routine proceeds to step S24 wherein the predetermined target surface temperature $T_1$ is corrected as a target surface temperature $T_{1b}$ used in the event of a snowfall. The routine then proceeds to step S25. The target surface temperature $T_{1b}$ used in the event of snowfall is selected to be higher than the target surface temperature $T_{1a}$ used in the absence of snowfall and increased with an increase in amount of snowfall. The controller 30 corrects the target surface temperature $T_1$ as a function of the amount of snowfall indicated by the information derived by the weather information receiver 44. This is because snow usually absorbs thermal energy from the light transmissive window 121, thereby requiring the need for increasing the amount of electricity supplied to the heater 20 as compared with the absence of snow, and also because it is necessary to increase the amount of electricity delivered to the heater 20 with an increase in amount of snowfall.

Alternatively, if the controller 30 determines in step S21 that the weather information receiver 44 does not still receive the weather information, then the routine proceeds to step S25. The current value of the target surface temperature $T_1$ is kept as it is.

In step S25, the controller 30 obtains the information from the ambient temperature sensor 41.

The following steps S26 to S30 and step S33 are identical in operation with steps S12 to S16 and step S19 in the first embodiment. The operations in steps S31 and S33 executed by the controller 30 separately from a sequence of steps S21 to S30 are identical with those in steps S17 and S18 in the first embodiment. Afterwards, the controller 30 terminates the determining operation in FIG. 8. The operations in steps S21 to S30 correspond to tasks of the target amount-of-energization determiner 32. The operations in steps S31 and S32 correspond to tasks of the permissible amount-of-energization calculator 33. The operation in step S33 corresponds to a task of the controlling value determiner 34.

3-3 Beneficial Advantages

The above described third embodiment offers the following advantages in addition to those in the first embodiment.

3*a*) In the third embodiment, the controller 30 analyzes the weather derived from the weather information receiver 44 to determine at least the snowfall condition around the vehicle. The controller 30 then works to properly control the amount of electricity supplied to the heater 20 using the snowfall condition in addition to the information obtained from the ambient temperature sensor 41 and the vehicle speed sensor 42. This ensures proper control of energization of the heater 20 depending upon the snowfall condition.

3*b*) Specifically, the controller 30 works to control the energization of the heater 20 by increasing the amount of electricity supplied to the heater 10 in the event of snowfall to be larger than that in the absence of snowfall. This achieves quick melting of snow adhered to the light transmissive window 121 in the event of snowfall and ensures the measurement accuracy of the LiDAR apparatus 100.

3*c*) The controller 30 is designed to control the amount of electricity supplied to the heater 20 depending upon the snowfall condition, such as the amount of snowfall, thereby achieving proper control of the energization of the heater 20.

4 Fourth Embodiment

The fourth embodiment is basically identical in structure with the third embodiment. The differences from the third embodiment will mainly be described without referring to the common structural elements.

Figure 9:
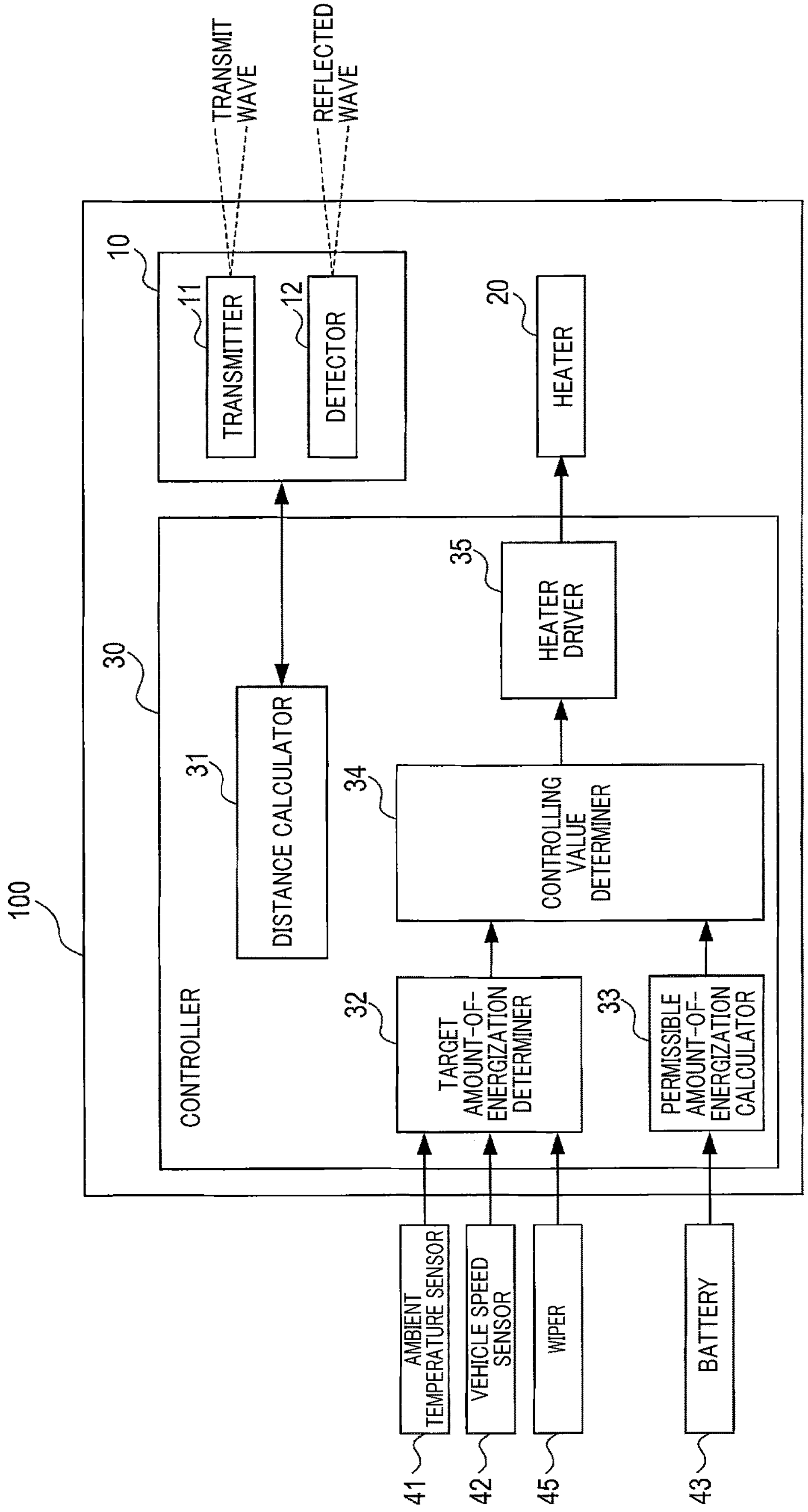
FIG. 9 is a block diagram which illustrates a structure of a LiDAR apparatus according to the fourth embodiment.

The controller 30 in the third embodiment determines the snowfall condition using the weather information derived from the weather information receiver 44, while the controller 30 in the fourth embodiment, as can be seen in FIG. 9, determines the snowfall condition using the ambient temperature and an operating state of the wiper 45. Specifically, the controller 30 determines that there is a snowfall when the ambient temperature is less than or equal to a given value, and the wiper 45 is operating. The wiper 45 whose operation is monitored may be implemented by a typical windshield wiper for a front window or windshield of the vehicle or a wiper designed to wipe the outer surface of the light transmissive window 121.

The controller 30 works to control the energization of the heater 20 depending upon the operating condition of the wiper 45. The wiper 45 is designed to work on multiple wiping speeds. When the wiper 45 is moving at a higher wiping speed, it usually means that there is a heavy snowfall. The controller 30, therefore, works to control the energization of the heater 20 by increasing the amount of electricity supplied to the heater 20 as the wiping speed of the wiper 45 increases.

The controller 30 executes a determining operation in the fourth embodiment instead of that illustrated in FIG. 8 in the third embodiment. The determining operation in the fourth embodiment is identical with that in the third embodiment except for three points discussed below. Specifically, the controller 30 initiates the operation in step S22 without executing the operation in step S21. In step S22, it is, as described already, determined whether there is a snowfall around the vehicle using the ambient temperature and the operating condition of the wiper 45. In step S24, the controller 30 corrects or sets the target surface temperature $T_1$ to the target surface temperature $T_{1b}$ used in the event of snowfall as a function of the wiping speed of the wiper 45.

The fourth embodiment offers substantially the same beneficial advantages as those in the third embodiment.

5 Fifth Embodiment

The fifth embodiment is basically identical in structure with the third embodiment. The differences from the third embodiment will mainly be described without referring to the common structural elements.

Figure 10:
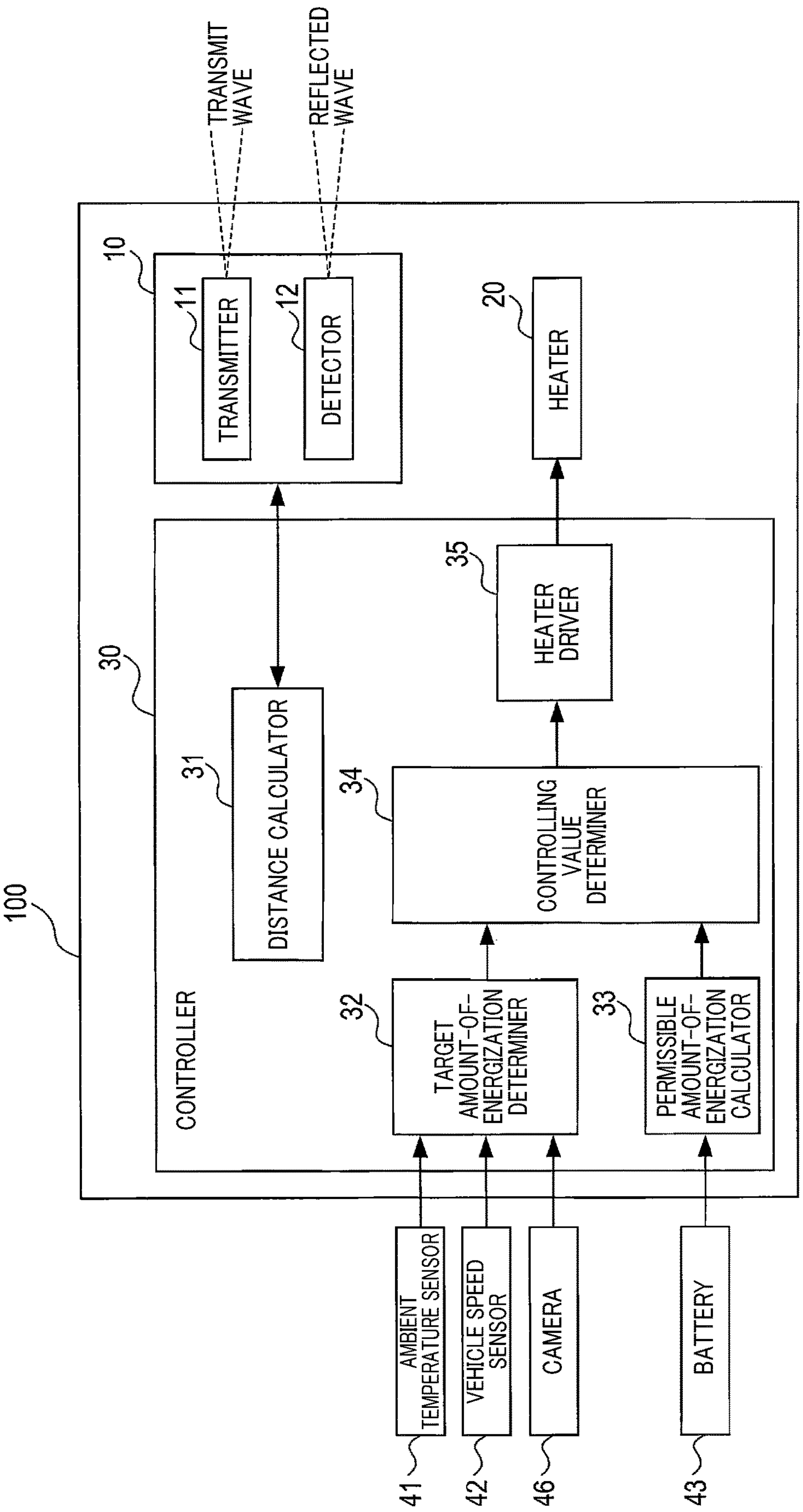
FIG. 10 is a block diagram which illustrates a structure of a LiDAR apparatus according to the fifth embodiment.

The controller 30 in the third embodiment analyzes the weather information derived from the weather information receiver 44 to determine the snowfall condition, while the controller 30 in the fifth embodiment uses analysis of an image of surroundings of the vehicle which is captured by the camera 46, as illustrated in FIG. 10, mounted in the vehicle to determine the snowfall condition.

The camera 46 is installed on a front inside portion of the vehicle. The camera 46 captures an image of a forward view in front of the vehicle cyclically at a given interval and outputs data on the image to an in-vehicle ECU, not shown. The ECU detects snow in the image taken by the camera 46 to analyze the snowfall condition, such as the amount of snowfall in a forward region in front of the vehicle. The controller 30 uses results of analysis made by the in-vehicle ECU to control the energization of the heater 20.

The controller 30 executes a determining operation in the fifth embodiment instead of that illustrated in FIG. 8 in the third embodiment. The determining operation in the fifth embodiment is identical with that in the third embodiment except for three points discussed below. Specifically, the controller 30 initiates the operation in step S22 without executing the operation in step S21. In step S22, it is, as described already, determined whether there is a snowfall in the forward region in front of the vehicle using results of analysis of the image taken by the camera 46. In step S24, the controller 30 corrects or sets the target surface temperature $T_1$ to the target surface temperature $T_{1b}$ as a function of the amount of snowfall derived using the image captured by the camera 46.

The fifth embodiment offers substantially the same benefits as those in the third embodiment.

6 Other Embodiments

While the embodiments have been described above, this disclosure is not limited to them, it should be appreciated that this disclosure can be embodied in various ways.

6*a*) The controller 30 in the above embodiments works to use the ambient temperature to control the energization of the heater 20 without use of the speed of the vehicle when the speed of the vehicle is less than or equal to a given value, but however, the controller 30 may alternatively be designed to control the energization of the heater 20 using the ambient temperature and the speed of the vehicle when the speed of the vehicle is less than or equal to the given value.

6*b*) In the first embodiment, the characteristic length L used to derive the heat transfer coefficient h is given by a dimension of the round corner 123 in the direction of travel of the vehicle between the upper surface 122 of the cover 120 and the front surface 121 of the light transmissive window 121, but however, the characteristic length L may be changed. The characteristic length L may be given by a dimension of a portion of the LiDAR apparatus 100 which is selected depending upon the configuration of the LiDAR apparatus 100 as long as the characteristic length L is a dimension of at least a portion of the upper surface or the lower surface of the case 110 which extends in the direction of travel of the vehicle. For instance, since it is undesirable for the LiDAR apparatus 100 that light emitted from the LiDAR apparatus 100 is optically blocked, the LiDAR apparatus 100 may be mounted to project outside the bumper of the vehicle. In this layout, the characteristic length L may be given by a dimension of a portion of, especially, the upper surface of the LiDAR apparatus 100 which protrudes from the bumper of the vehicle in the direction of travel of the vehicle. This is because the portion of the LiDAR apparatus 100 which protrudes outside the vehicle is usually thought of as being influenced by a flow of air during movement of the vehicle. In a case where the portion of the LiDAR apparatus 100 which protrudes from the vehicle in the direction of travel of the vehicle varies in the width-wise direction of the vehicle, the characteristic length L may be given by a maximum dimension of the portion of the LiDAR apparatus 100 in the direction of travel of the vehicle.

6*c*) In the above embodiments, when the energization of the heater 20 is controlled as a function of the ambient temperature without use of the speed of the vehicle, the controller 30 is, as described above, designed to control the amount of electricity supplied to the heater 20 according to the second function without use of the table, but however, the controller 30 may use the table listing conditions to energize the heater 20 which are defined as a function of the ambient temperature in the case where the energization of the heater 20 is controlled without use of the speed of the vehicle.

6*d*) In the above embodiments, the controller 30 is configured to control the energization of the heater 20 using the battery voltage in addition the ambient temperature and the speed of the vehicle, but however, the controller 30 may alternatively work to control the operation of the heater 20 without consideration of the battery voltage.

6*e*) In the third embodiment, when controlling the energization of the heater 20, like in the first embodiment, using the ambient temperature and the speed of the vehicle, the controller 30 determines the amount of electricity supplied to the heater 20 according to a mathematical function using parameters indicating the ambient temperature and the speed of the vehicle, but however, the controller 30 may alternatively be designed in the third embodiment to use, like in the second embodiment, a table listing conditions to energize the heater 20 which are defined as a function of the ambient temperature and the speed of the vehicle in the case where the energization of the heater 20 is controlled using the ambient temperature and the speed of the vehicle.

For instance, two types of tables may be provided in which conditions to energize the heater 20 are held in the event of snowfall and in the absence of snowfall, respectively. The table used in the event of snowfall is defined to have parameters which determine the amount of electricity supplied to the heater 20 to be larger than that in the absence of snowfall. When determining that there is a snowfall, the controller 30 determines the condition to energize the heater 20 by look-up using the table used in the event of snowfall. Alternatively, when determining that there is no snowfall, the controller 30 determines the condition to energize the heater 20 by look-up using the table used in the absence of snowfall.

The above modification may be applied to the fourth and fifth embodiments.

6*f*) In the above embodiments, the vehicle speed sensor 42 determines whether the vehicle speed sensor 42 itself is malfunctioning and outputs the malfunction signal to the controller 30 in the event of the malfunction. When receiving the malfunction signal from the vehicle speed sensor 42, the controller 30 switches the mode of operation thereof to a fail-safe mode used in the event of malfunction of the vehicle speed sensor 42. The diagnosis of the malfunction of the vehicle speed sensor 42 may be made in another way. For instance, the controller 30 may use information transmitted in the form of a pulse signal from the vehicle speed sensor 42 to determine whether the vehicle speed sensor 42 is malfunctioning.

6*g*) In the above embodiments, the heater 20 is equipped with the transmitter heater 21 and the detector heater 22. The transmitter heater 21 and the detector heater 22 each include the transparent conductive film Fi and the pair of electrodes LDi and LGi, but however, they may alternatively be designed to have another structure. For instance, the heater 20 may be made by a film heater which has a base film on which a meandering heater conductor is arranged.

6*h*) In the above embodiments, the ranging apparatus is implemented by the LiDAR apparatus 100, but however, it may alternatively be made of a millimeter-wave radar or an ultrasonic sensor.

6*i*) In the above embodiments, the LiDAR apparatus 100 is mounted in a front portion of the vehicle, but however, may alternatively be arranged on the side or the rear of the vehicle.

6*j*) In the above embodiments, the light transmissive window 121 is a window through which a transmit wave and a return of the transmit wave will pass, but however, the light transmissive window 121 may be designed to permit at least one of the transmit wave and the return of the transmit wave to pass therethrough. The light transmissive window 121 in the above embodiments is transparent to allow light (i.e., the transmit wave) to pass therethrough, but however, may alternatively be made of an opaque material as long as the light transmissive window 121 permits the transmit wave to pass therethrough. In other words, the material of the light transmissive window 121 may be selected depending upon the type of transmit wave.

6*k*) The functions to be executed by one of the structural units in the above embodiments may be shared with another of the structural units. Alternatively, the functions in some of the structural units may be made by one of the structural units. One or some of the structural units in each of the embodiments may be omitted or added to another embodiment.

6*i*) The LiDAR apparatus 100, the controller 30, the programs executed to realize a computer constituting the controller 30, the recording medium in which the programs are stored, or the method of controlling the energization of the heater 20 may be modified or realized in various ways in this disclosure.

What is claimed is:

1. A ranging apparatus which is mountable in a vehicle and works to emit a transmit wave and detects a reflected wave resulting from reflection of the transmit wave from an object to determine a distance between the ranging apparatus and the object, comprising:

a light transmissive window through which at least one of the transmit wave and the reflected wave passes;

a heater which is configured to apply heat to the transmissive window; and a controller which works to control energization of the heater as a function of an ambient temperature outside the ranging apparatus and a speed of the vehicle derived by a vehicle speed sensor, wherein when the vehicle speed sensor is malfunctioning, the controller controls the energization of the heater as a function of the ambient temperature without use of the speed of the vehicle.

2. The ranging apparatus as set forth in claim 1, wherein when the speed of the vehicle is less than a given value, the controller also controls the energization of the heater as a function of the ambient temperature without use of the speed of the vehicle.

3. The ranging apparatus as set forth in claim 1, wherein when controlling the energization of the heater using the ambient temperature and the speed of the vehicle, the controller controls an amount of electricity supplied to the heater according to a mathematical function using parameters representing the ambient temperature and the speed of the vehicle.

4. The ranging apparatus as set forth in claim 3, further comprising a case which includes the light transmissive window, and wherein the mathematical function using the parameters representing the ambient temperature and the speed of the vehicle is defined based on a heater transfer coefficient derived using a Nusselt number and a characteristic length that is a length of at least a portion of an upper surface or a lower surface of the case which extends in a direction in which the vehicle travels.

5. The ranging apparatus as set forth in claim 1, wherein when controlling the energization of the heater using the ambient temperature without use of the speed of the vehicle, the controller controls an amount of electricity supplied to the heater according to a mathematical function using a parameter representing the ambient temperature, not the speed of the vehicle.

6. The ranging apparatus as set forth in claim 5, wherein the mathematical function using the parameter representing the ambient temperature, not the speed of the vehicle is given by an equation calculating a product of a constant, a value derived by subtracting the ambient temperature from a predetermined target surface temperature of the heater, and a surface area of the heater as an electrical power delivered to the heater.

7. The ranging apparatus as set forth in claim 1, wherein when controlling the energization of the heater as a function of the ambient temperature and the speed of the vehicle, the controller controls an amount of electricity supplied to the heater using a table listing conditions to energize the heater which are pre-defined in relation to the ambient temperature and the speed of the vehicle.

8. The ranging apparatus as set forth in claim 1, wherein the vehicle speed sensor determines whether the vehicle speed sensor is malfunctioning and outputs a malfunction signal indicating an event of malfunction to the controller, and when receiving the malfunction signal from the vehicle speed sensor, the controller switches a control mode thereof to a mode used to control the energization of the heater when the vehicle speed sensor is determined to be malfunctioning.

* * * * *